United States Patent [19]
Cross et al.

[11] 3,929,905
[45] Dec. 30, 1975

[54] CHLOROMETHYL 1,1-DIMETHYL-2-PROPYNYL ETHER AND PROCESS

[75] Inventors: Barrington Cross, Rocky Hill; Charles Paul Grasso, Cranbury, both of N.J.

[73] Assignee: American Cyanamid Company, Stamford, Conn.

[22] Filed: Feb. 7, 1974

[21] Appl. No.: 440,631

[52] U.S. Cl. ............................... 260/614 R; 71/120
[51] Int. Cl.² ......................................... C07C 43/14
[58] Field of Search ................................. 260/614 R

[56] References Cited
UNITED STATES PATENTS

| | | | |
|---|---|---|---|
| 2,304,431 | 12/1942 | Walker | 260/614 R |
| 2,805,259 | 9/1957 | Hurd | 260/614 R |
| 3,021,375 | 2/1962 | Waid et al. | 260/651.11 A |

FOREIGN PATENTS OR APPLICATIONS

| | | | |
|---|---|---|---|
| 135,310 | 8/1901 | Germany | 260/614 R |

OTHER PUBLICATIONS

Snostakovskii et al., J. Org. Chem., U.S.S.R., 4 (1968), pp. 1117–1119.
Black et al., J. Chem. Soc. (1965), pp. 5225–5230.
Fuson et al., Organic Reactions, Vol. 1, John Wiley, N.Y., (1962) pp. 64–68.

*Primary Examiner*—Howard T. Mars
*Attorney, Agent, or Firm*—H. G. Jackson

[57] ABSTRACT

The compound is chloromethyl 1,1-dimethyl-2-propynyl ether which is useful as an intermediate in the preparation of herbicidal compositions. The compound is prepared by reacting 2-methyl-3-butyne-2-ol with para-formaldehyde and hydrogen chloride.

1 Claim, No Drawings

CHLOROMETHYL 1,1-DIMETHYL-2-PROPYNYL ETHER AND PROCESS

CROSS REFERENCE TO RELATED APPLICATION

This application is a continuation-in-part of copending application Ser. No. 236,231, filed Mar. 20, 1972 now abandoned.

BACKGROUND OF THE INVENTION

1. Field of the Invention

The invention pertains to a new organic chemical and a method for its manufacture.

2. Description of the Prior Art

Although the reaction of aldehydes such as formaldehyde or para-formaldehyde and aliphatic or araliphatic alcohols with hydrogen halides is known to result in the formation of α-halomethyl ethers in good yields, this reaction has generally been considered applicable only to aldehydes and primary and secondary alcohols. This is evidenced by the fact that (1) tertiary acetylene chloromethyl ethers are new and that (2) publications such as Wagner and Zook, "Synthetic Organic Chemistry," published by John Wiley and Sons, Inc., 153 (page 230), *Journal of the American Chemical Society*, 53, 4077 (1931) and Golse, R., *Bulletin de la Societe de Pharmacie de Bordeaux*, 113–114 (1959) lack any suggestion that the above-described process is applicable to tertiary alcohols. The lack of any suggestion that the process can be utilized for reaction with tertiary alcohols is not, however, surprising. One skilled in the art would normally predict that under the conditions of the reaction, a tertiary alcohol would generate the tertiary carbonium ion which would proceed to generate the appropriate olefin. It was, therefore, surprising to discover that tertiary acetylenic alcohol reacts with para-formaldehyde and hydrogen chloride in a temperature range of −30°C. to 20°C. to give good yields of tertiary acetylenic chloromethyl ether.

SUMMARY OF THE INVENTION

The tertiary acetylenic alcohols, 2-methyl-3-butyne-2-ol, reacts with para-formaldehyde and hydrogen chloride in a temperature range of −30°C. to 20°C. to yield chloromethyl 1,1-dimethyl-2-propynyl ether.

DETAILED DESCRIPTION

The reaction of the invention is illustrated as follows:

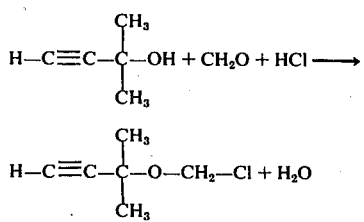

For example, the tertiary acetylenic alcohol, 2-methyl-3-butyne-2-ol, reacts with para-formaldehyde and hydrogen chloride in a temperature range of 2°C. to 8°C. to give good yields of chloromethyl 1,1-dimethyl-2-propynyl ether.

The reaction to the tertiary acetylenic chloromethyl ether is found to proceeds without the addition of a solvent, but equally good yields are obtained in an aprotic solvent such as methylene chloride, chloroform, benzene or toluene in the temperature range of −30°C. to 20°C. The preferred reaction is run in the presence of a dehydrating agent such as anhydrous calcium chloride or zinc chloride. The product is usually isolated by distillation under reduced pressure.

The compound of the invention is useful as an intermediate for an extremely effective herbicidal agent and may be converted to the agent by reaction of the appropriate chloroalkyl ether wiith an alkali metal salt of a ureido phenol.

The alkali metal salt of the ureido phenol can be prepared by dissolving the ureido phenol haaving the structure:

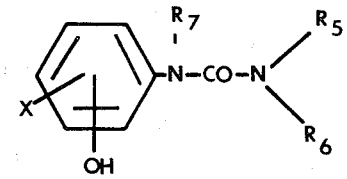

where X is hydrogen, halogen, alkyl $C_1$–$C_4$, alkoxy $C_1$–$C_4$, monohaloalkyl $C_1$–$C_4$, dihaloalkyl $C_1$–$C_4$, trihaloalkyl $C_1$–$C_4$, or nitro; and $R_5$, $R_6$ and $R_7$ each represent hydrogen, alkyl $C_1$–$C_4$ or alkoxy $C_1$–$C_4$; in a lower alcohol, preferably methanol or ethanol, and treating the resulting mixture with an alkali metal. The alkali metal is preferably in the form of an alkali metal alkoxide, alkali metal hydroxide or lithium butyl in ether. Representative alkoxides and hydroxides are sodium methoxide, sodium ethoxides, potassium t-butoxide, sodium hydroxide and potassium hydroxide. This reaction mixture is then gently heated at reflux, i.e., 65°C. to 78°C., for about 30 minutes and the solvent removed. The product is dried by azeotropic distillation using benzene, toluene or similar solvent and has the formula:

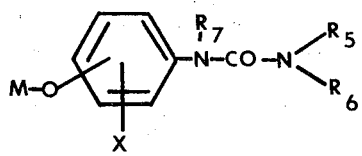

where X, $R_5$, $R_6$ and $R_7$ are as described above and M is an alkali metal. The dry product obtained from the reaction is then suspended in a dry lower aliphatic ketone such as acetone, methylethylketone, or the like, maintained at between about 0°C. and 30°C. and the appropriate alkynylchloroalkyl ether slowly added thereto with continuous stirring. The reaction is exothermic and almost instantaneous. However, in practice, it is generally desirable to continue stirring the reaction mixture for about 30 minutes to 24 hours after addition is complete. The reaction mixture is then poured into about four volumes of ice-water containing from about 1 to 10 percent of an alkali metal carbonate, acetate or hydroxide. After stirring for a period of time, usually up to 5 hours, solid product generally forms and can be separated by any convenient means such as filtration or centrifugation. In some cases, however, chloroform extraction, evaporation and crystallization of the residue may be required. The reaction can be graphically illustrated as follows:

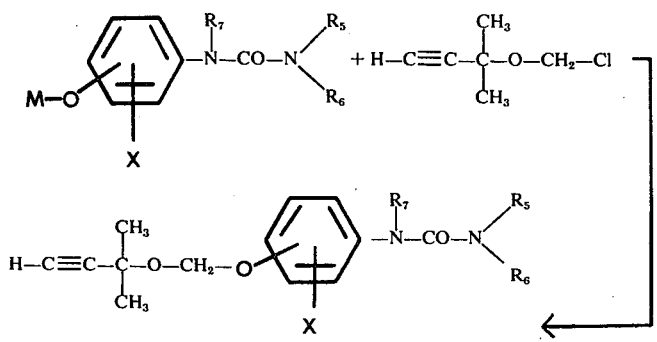

where $R_5$, $R_6$, $R_7$, X and M are defined above.

EXAMPLE 1

Chloromethyl 1,1-dimethyl-2-propynyl ether

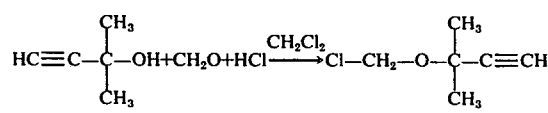

Hydrogen chloride gas (80 grams, 2.2 moles) was bubbled into a mixture of para-formaldehyde (60.2 grams, 2.0 moles), and 2-methyl-3-butyl-2-ol (168.2 grams, 2.0 moles) in methylene chloride (500 ml.) over a 25 minute period, with constant stirring while the temperature was maintained between 2°C. to 8°C. Upon completion of the addition, the reaction temperature was allowed to rise to 10°C., then the lower organic phase separated, washed with ice-water, separated and dried over anhydrous calcium chloride for 18 hours. The methylene chloride was removed by evaporation and the resulting liquid distilled at reduced pressure to give a forerun of 10 grams, boiling point 55°C. to 57°C./54 mm. and the major fraction as the chloromethyl ether, chloromethyl 1,1-dimethyl-2-propynyl ether, 140 grams, 53 percent, boiling point 54°C. to 58°C./37 to 40 mm.

The infrared spectra shows $\nu$(film) 3300 cm$^{-1}$ strong (C≡CH stretch), 2115 cm$^{-1}$ medium (C≡CH stretch).

The nmr spectra shows an —OCH$_2$ group as a singlet at 4.29$\tau$; the acetylenic proton as a singlet at 7.40$\tau$, and the two methyl groups as a singlet at 8.42$\tau$.

The same chloromethyl ether was also prepared in the absence of an added solvent in 32 percent yield, boiling point 39.5°C. to 41.5°C./16 to 17 mm.

EXAMPLE 2

3-{p-[(1,1-Dimethyl-2-propynyloxy)methoxy]phenyl}-1,1-dimethylurea 1,1-Dimethyl-2-propynylchloromethyl ether (1.35 grams, 0.01 mole) was added to a well stirred dry acetone suspension of the isolated and dried sodium salt (2.03 grams, 0.01 mole) of 3-(4-hydroxyphenyl)-1,1-dimethylurea, prepared in methanol from the above phenyl with sodium methoxide. An exotherm to 29°C. was observed and the reaction then allowed to stir for 3 hours at room temperature. Then a cold sodium carbonate solution (10% w/v 125 ml.) was added to the reaction and stirred for ½ hour. The resulting solid was filtered, washed with water, dried, and crystallized from a benzenehexane mixture to give 3-{p-[(1,1-dimethyl-2-propynyloxy)-methoxy]phenyl}-1,1-dimethylurea, 1.63 grams (59 percent), melting point 75°C. to 76°C.

Analysis calculated for $C_{15}H_{20}N_2O_3$: C, 65.19; H, 7.30; N, 10.14. Found: C, 65.37; H, 7.23; N, 10.05.

EXAMPLE 3

The selective postemergence herbicidal activity of the compound 3-{p-[(1,1-dimethyl-2-propynyloxy)methoxy]-phenyl}-1,1-dimethylurea derived from the intermediate compound of the invention is demonstrated by the following tests, wherein a variety of monocotyledonous and dicotyledonous plants are treated with test compounds dispersed in aqueous acetone mixtures. In the tests, seedling plants are grown in jiffy flats for about two weeks. The test compound is dispersed in 50/50 acetone/water mixtures in sufficient quantity to provide the equivalent of about 0.06 to 10 pounds per acre of active compound when applied to the plants through a spray nozzle operating at 40 psi. for a predetermined time. After spraying, the plants are placed on greenhouse benches and are cared for in the usual manner, commensurate with conventional greenhouse practices. Two weeks after treatment, the seedling plants are examined and rated according to the rating system provided below. The data obtained are reported in Table I below where it can be seen that the compound is highly effective for the control of undesirable broadleaved weed and grasses.

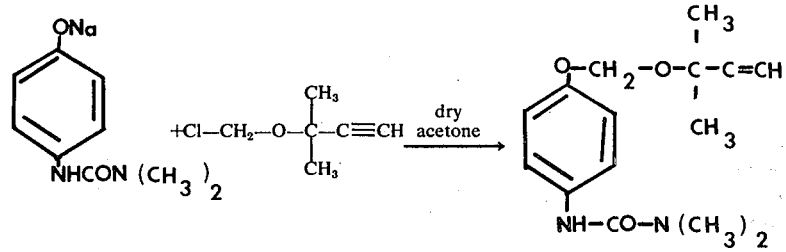

TABLE I

Postemergence Herbicidal Activity

Structure

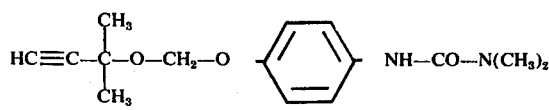

| Treatment | Annual Weeds | | | | | | | | | | Crops | | | |
|---|---|---|---|---|---|---|---|---|---|---|---|---|---|---|
| lb./Acre | LA | MU | PI | RAG | MG | BA | CR | GRF | WO | VE | COR | COT | SOY | R |
| 1.0 | 9 | 9 | 9 | 8 | 9 | 9 | 9 | 7 | 8 | 9 | 9 | 9 | 9 | 9 |
| 0.5 | 9 | 9 | 9 | 8 | 9 | 6 | 9 | 5 | 6 | 9 | 9 | 9 | 9 | 7 |
| 0.13 | 7 | 9 | 9 | 9 | 9 | 2 | 1 | 2 | 3 | 9 | 8 | 9 | 5 | 3 |
| 0.06 | 5 | 8 | 9 | 0 | 9 | 1 | 1 | 2 | 3 | 8 | 3 | 9 | 3 | 3 |

RATING SYSTEM
Plant Abbreviations:

| | | |
|---|---|---|
| LA | - | Lambsquarters |
| MU | - | Mustard |
| PI | - | Pigweed |
| BA | - | Barnyard grass |
| CR | - | Crabgrass |
| GRF | - | Green foxtail |
| WO | - | Wild oats |
| COR | - | Corn |
| COT | - | Cotton |
| SOY | - | Soybean |
| RAG | - | Ragweed |
| MG | - | Morning-glory |
| R | - | Rice |
| VE | - | Velvet leaf |

| Rating System: | % Difference in Growth from the Check* |
|---|---|
| 0 - no effect | 0 |
| 1 - possible effect | 1–10 |
| 2 - slight effect | 11–25 |
| 3 - moderate effect | 26–40 |
| 5 - definite injury | 41–60 |
| 6 - herbicidal effect | 61–75 |
| 7 - good herbicidal effect | 76–90 |
| 8 - approaching complete kill | 91–99 |
| 9 - complete kill | 100 |
| 4 - abnormal growth, i.e., a definite physiological malformation but with an over-all effect less than a 5 on the rating scale. | |

*Based on visual determination of stand, size, vigor, chlorosis, growth malformation and over-all plant appearance.

EXAMPLE 4

The selective preemergence herbicidal activity of the compound derived from the intermediate compound of the invention is demonstrated by the following tests in which the seeds of a variety of monocotyledonous and dicotyledonous plants are separately mixed with potting soil and planted on top of approximately one inch in separate pint cups. After planting, the cups are sprayed with the selected aqueous solution containing test compound in sufficient quantity to provide the equivalent of about 0.13 to 4 pounds per acre of test compound per cup. The treated cups are then placed on greenhouse benches and cared for in accordance with greenhouse procedures. Three weeks after treatment, the tests are terminated and each cup is examined and rated according to the rating system set forth in the preceding example. The tabulated results of these tests establish the selective herbicidal proficiency of the test compound, when properly applied, for controlling a variety of undesiraable plant species. The data also indicate broad specteum activity of the compound when applied at relatively high rates. Results are reported in Table II below.

Preemergence Herbicidal Activity
Structure

| Treatment | Annual Weeds | | | | | | | | | | Crops | | | |
|---|---|---|---|---|---|---|---|---|---|---|---|---|---|---|
| lb./Acre | LA | MU | PI | RAG | MG | BA | CR | GRF | WO | VE | COR | COT | SOY | R |
| 4.0 | 9 | 9 | 9 | 9 | 9 | 9 | 9 | 9 | 9 | 9 | 9 | 9 | 9 | 9 |
| 1.0 | 9 | 9 | 9 | 9 | 9 | 9 | 9 | 9 | 7 | 9 | 7 | 9 | 9 | 9 |
| 0.25 | 9 | 9 | 9 | 9 | 9 | 9 | 9 | 9 | 7 | 9 | 1 | 9 | 8 | 9 |
| 0.13 | 9 | 9 | 9 | 9 | 9 | 9 | 8 | 6 | 6 | 9 | 1 | 2 | 3 | 8 |

We claim:
1. Chloromethyl 1,1-dimethyl-2-propynyl ether.

* * * * *